United States Patent
Hsu (10) Patent No.: US 8,251,600 B2
(45) Date of Patent: Aug. 28, 2012

(54) MECHANICAL SHUTTER AND PORTABLE ELECTRONIC DEVICE WITH SAME

(75) Inventor: Hsueh-Feng Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/821,147

(22) Filed: Jun. 23, 2010

(65) Prior Publication Data

US 2011/0217033 A1    Sep. 8, 2011

(30) Foreign Application Priority Data

Mar. 4, 2010    (TW) ............................... 99106242 A (51) Int. Cl.
    *G03B 9/10*    (2006.01)
(52) U.S. Cl. .................. 396/493; 348/363; 359/739
(58) Field of Classification Search .................. 396/493, 396/497, 495, 459; 348/363; 359/739
    See application file for complete search history.

(56) References Cited

U.S. PATENT DOCUMENTS

| 5,646,770 | A * | 7/1997 | Sato et al. .................. 359/230 |
| 2005/0226611 | A1* | 10/2005 | Kawaguchi .................. 396/505 |
| 2008/0279545 | A1* | 11/2008 | Westerweck .................. 396/501 |
| 2008/0317460 | A1* | 12/2008 | Eromaki .................. 396/497 |
| 2010/0202770 | A1* | 8/2010 | Kihara et al. .................. 396/493 |

FOREIGN PATENT DOCUMENTS

WO    WO 2009004975 A1 *    1/2009

* cited by examiner

*Primary Examiner* — Christopher Mahoney
*Assistant Examiner* — Fang-Chi Chang
(74) *Attorney, Agent, or Firm* — Altis Law Group, Inc.

(57) ABSTRACT

A mechanical shutter includes a base, a cover, a primary blade and a secondary blade. The base includes a first through hole and a connecting shaft extending from the base. The cover includes a second through hole and a connecting hole. The connecting shaft of the base extends through the connecting hole to secure the cover to the base. The first through hole is coaxial to the second through hole, thereby cooperatively forming an light passage. The primary blade and the secondary blade are moveably interconnected so when the primary blade rotates around the connecting shaft relative to the base, the primary blade carries the secondary blade to move, and the secondary blade moves together to cover or expose the light passage.

20 Claims, 8 Drawing Sheets

MECHANICAL SHUTTER AND PORTABLE ELECTRONIC DEVICE WITH SAME

BACKGROUND

1. Technical Field

The present disclosure relates to a mechanical shutter and a portable electronic device with the mechanical shutter.

2. Description of Related Art

In recent years, portable electronic devices, such as cell phones with cameras have become more and more popular. A typical camera used in the portable electronic device is equipped with a shutter, and an image sensor such as a charge coupled device (CCD) or a complementary metal-oxide semiconductor (CMOS) sensor, which is exposed automatically at a predetermined shutter speed. The shutter is provided to regulate the quantity of light reaching the CCD or CMOS by opening or shutting sectors (shutter blades).

A conventional camera adopts a mechanical shutter, which uses an arrangement of springs, cams, and gears to control the speed of the shutter. However, the shutter always has a complex structure with more than two blades and occupies a large amount of space in the camera. When the shutter is employed in a portable electronic device such as a cell phone, sufficient space must be secured to arrange the shutter, and therefore, the miniaturization of the portable electronic device has been a problem.

Therefore, a mechanical shutter with simpler structure and smaller size which can overcome the above-mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
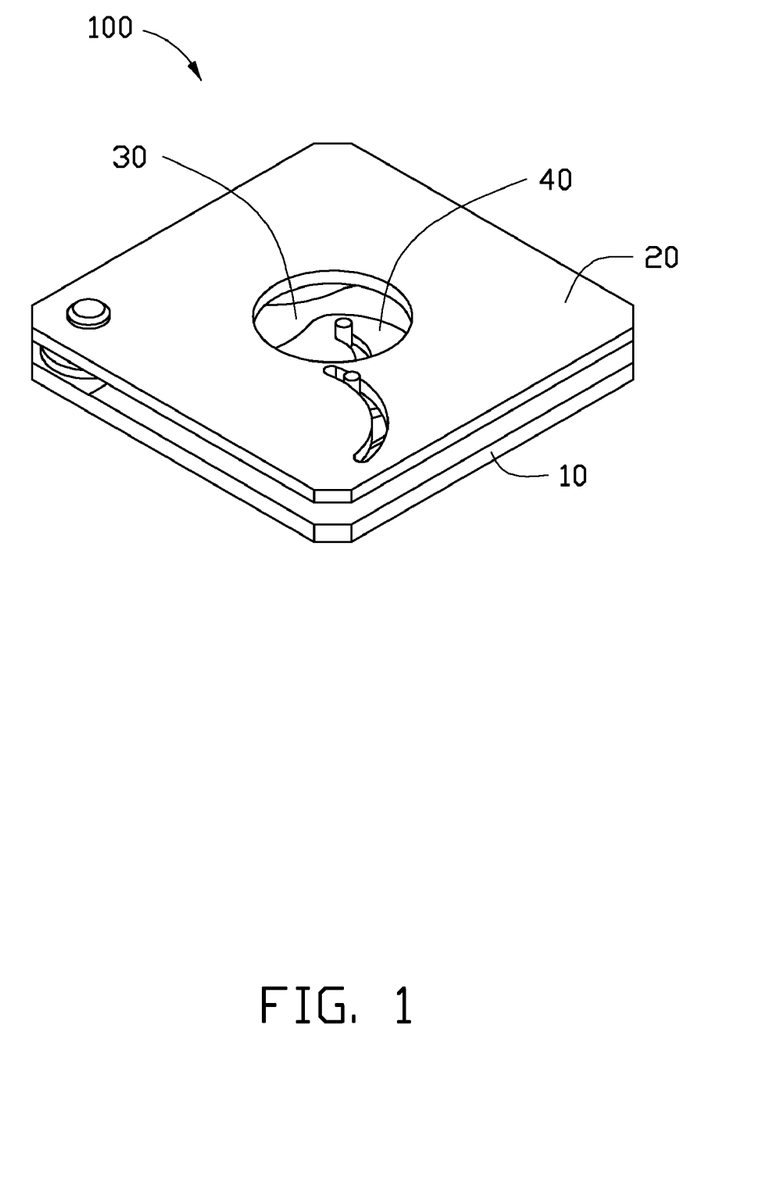
FIG. 1 is an isometric view of a mechanical shutter according to a first embodiment.
Figure 2:
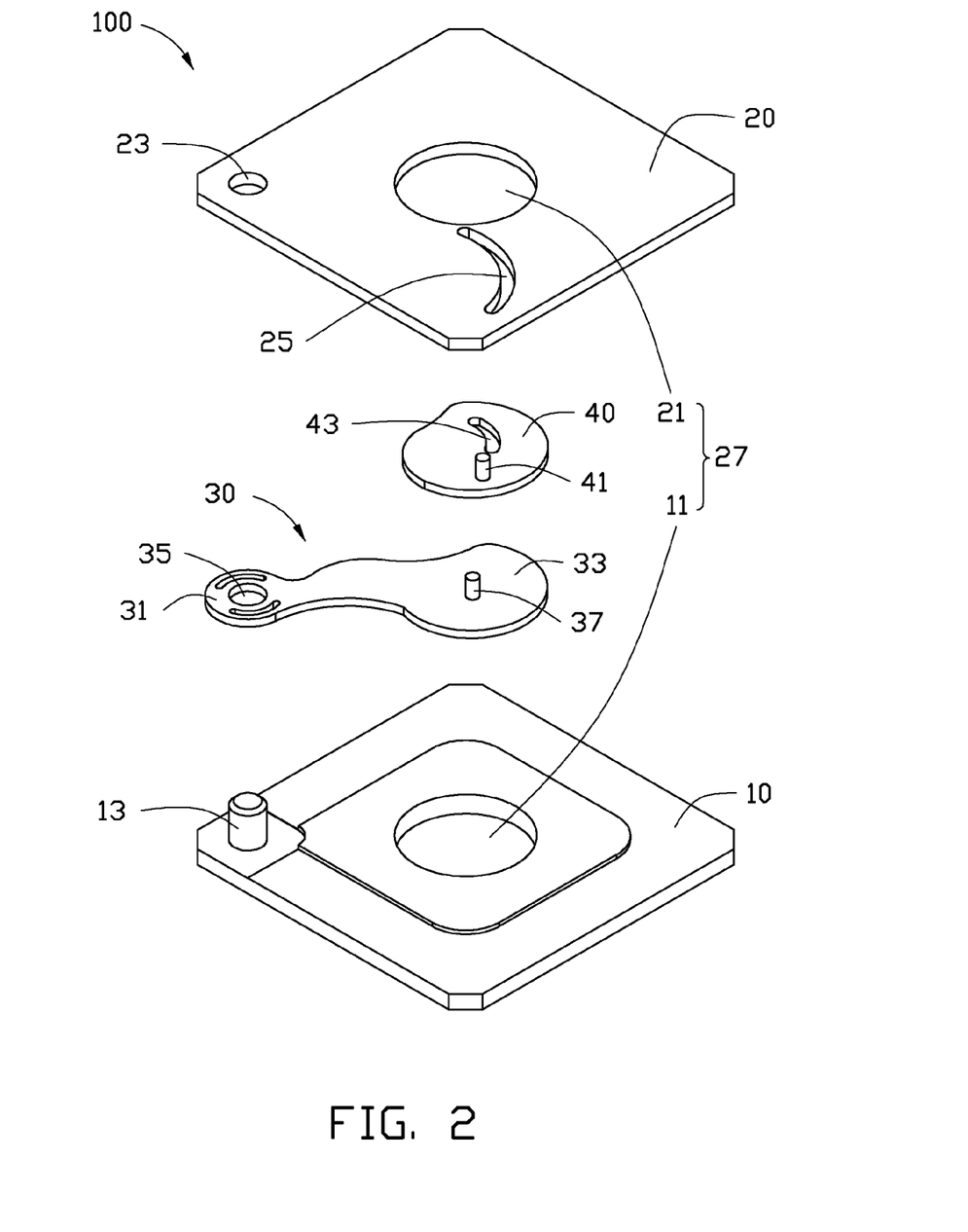
FIG. 2 is an exploded, isometric view of the mechanical shutter of FIG. 1.

Referring to FIGS. 1 and 2, a mechanical shutter 100 in accordance with a first embodiment is provided. The mechanical shutter 100 includes a base 10, a cover 20, a primary blade 30, and a secondary blade 40. The base 10 is connected to the cover 20, thereby cooperatively forming a housing of the mechanical shutter 100.

The base 10 defines a first through hole 11. The cover 20 defines a second through hole 21. The first through hole 11 is coaxial to the second through hole 21, thereby cooperatively defining a light passage 27. The primary blade 30 and the secondary blade 40 are secured in the housing. The primary blade 30 and the secondary blade 40 are movably connected together.

In this embodiment, the base 10 is generally square with four corners. The first through hole 11 is located in the center of the base 10. The base 10 includes a connecting shaft 13, and the connecting shaft 13 is located in one of the four corners of the base 10.

The connecting shaft 13 is perpendicular to the base 10, and extends upward to the cover 20.

In this embodiment, the cover 20 defines a connecting hole 23 and a first slot 25. The cover 20 is generally square with four corners corresponding to the base 10. The second through hole 21 is located in the center of the cover 20. The connecting hole 23 is located in one of the four corners of the cover 20 spatially corresponding to the connecting shaft 13. The connecting shaft 13 extends through the connecting hole 23 to secure the base 10 to the cover 20. Accordingly, the base 10 and the cover 20 cooperatively form a housing of the mechanical shutter 100. The axis of the first through hole 11 and the axis of second through hole 21 are collinear, thus cooperatively define the light passage 27.

In this embodiment, the first slot 25 is arc-shaped. The first slot 25 has two slot portions. One slot portion of the slot 25 is adjacent to the second through hole 21, the other slot portion of the slot 25 is far from the second through hole 21.

The primary blade 30 has a connecting end 31 and a switch end 33 which is at the opposite end of the primary blade 30 away from the connecting end 31. The connecting end 31 is rotatably connected with the connecting shaft 13 of the base 10. The connecting end 31 defines a shaft hole 35. The connecting shaft 13 of the base 10 extends through the shaft hole 35 of the primary blade 30, thus, the primary blade 30 is able to rotate around the connecting shaft 13 relative to the base 10.

The switch end 33 includes a second post 37. The second post 37 is used to link the secondary blade 40. In this embodiment, the second post 37 is perpendicular to the primary blade 30. The second post 37 is positioned on the surface of the primary blade 30, which is nearest to the cover 20, and the second post 37 extends up to the cover 20.

The secondary blade 40 includes a first post 41 and a second slot 43. The first post 41 extends through the first slot 25 of the cover 20. The diameter of the first post 41 is less than the width of the first slot 25, thus, the first post 41 is capable of sliding in and along the first slot 25. The second post 37 of the primary blade 30 extends through the second slot 43, and the diameter of the second post 37 is less than the width of the second slot 43 of the secondary blade 40, thus, the second post 37 is capable of sliding in and along the second slot 43. When the primary blade 30 rotates around the connecting shaft 13 relative to the base 10, the second post 37 drives the secondary blade 40, therefore, the secondary blade 40 moves with the primary blade 30, and the first post 41 of the secondary blade 40 slides in and along the first slot 25. In this embodiment, each of the primary blade 30 and the secondary blade 40 is a discrete body having a fixed size, and the shape of the primary blade 30 and the shape of the secondary blade 40 remain the same during operation of the mechanical shutter 100 (see also below).

Figure 3:
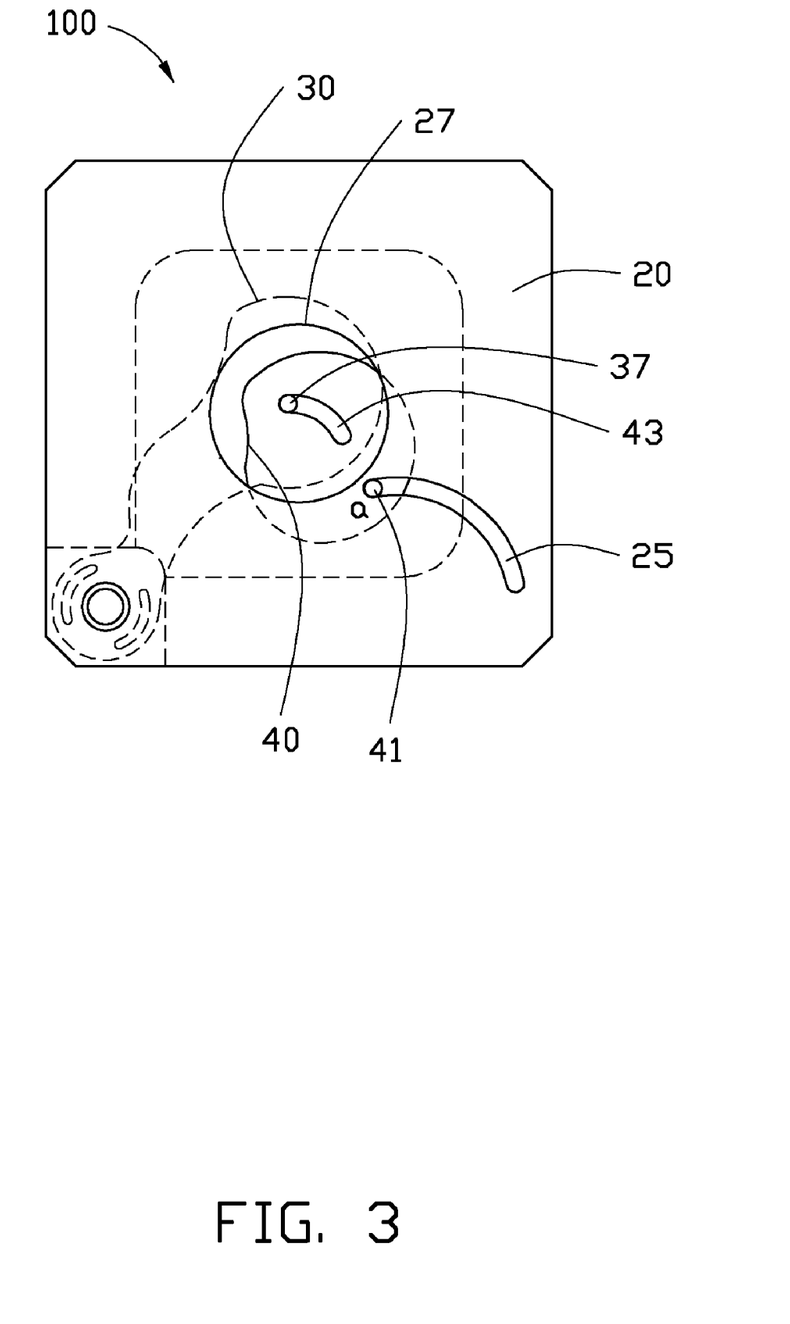
FIG. 3 is a plan view of the mechanical shutter of FIG. 1, showing a light passage of the mechanical shutter totally covered by the blades of the mechanical shutter.
Figure 4:
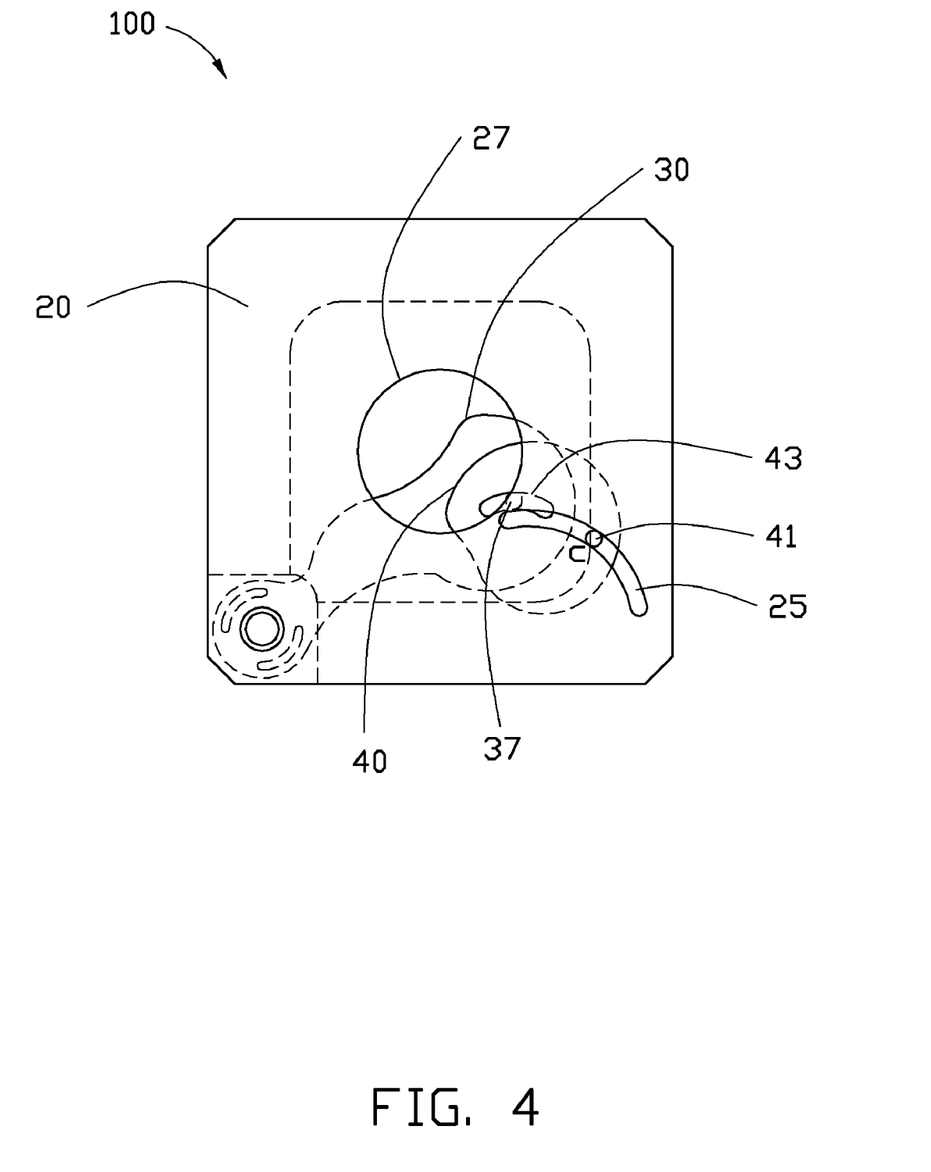
FIG. 4 is a plan view of the mechanical shutter of FIG. 1, showing a light passage of the mechanical shutter partly covered by the blades of the mechanical shutter.
Figure 5:
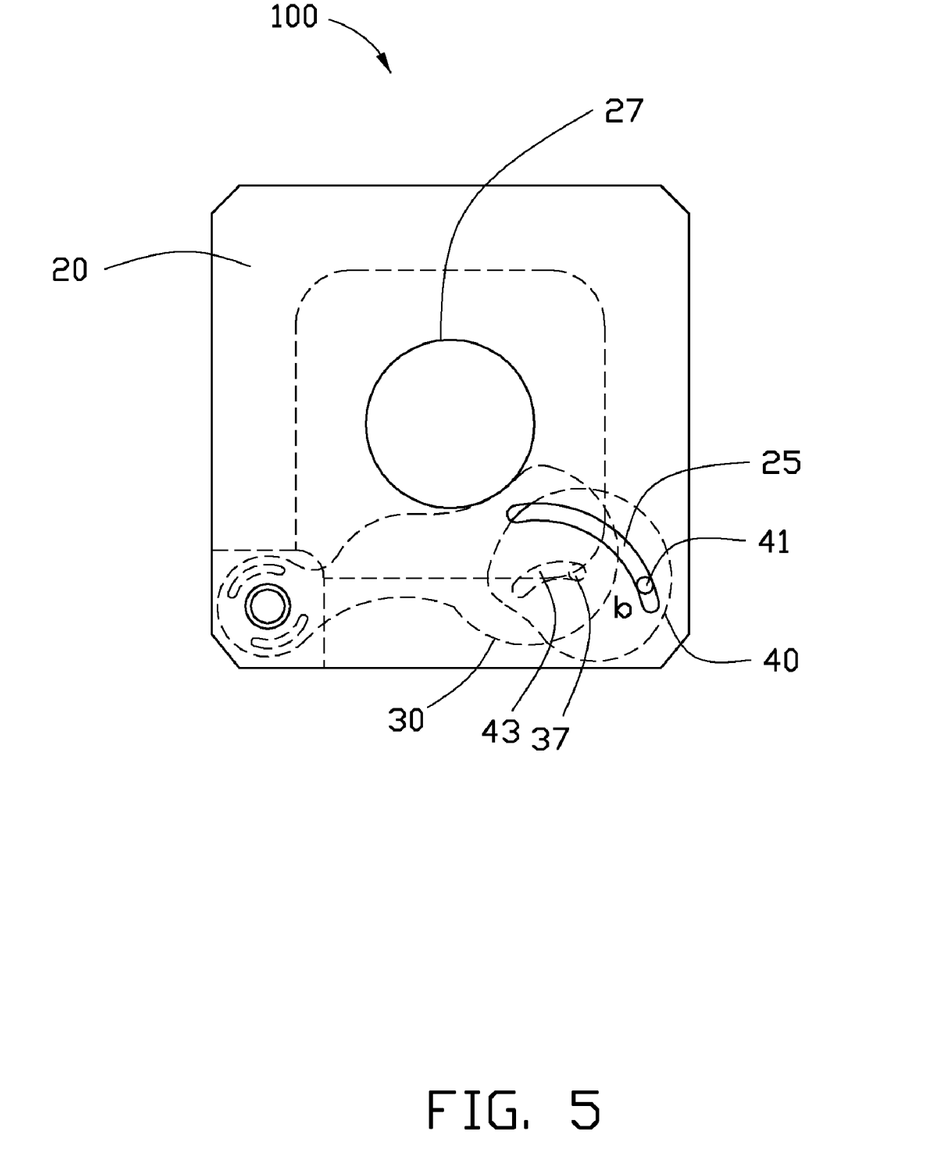
FIG. 5 is a plan view of the mechanical shutter of FIG. 1, showing a light passage of the mechanical shutter open.

Referring to FIGS. 3-5, when the primary blade 30 carries the secondary blade 40 to move and rotate about the first post 41, the first post 41 of the secondary blade 40 may be in different positions of the first slot 25. When the first post 41 is in the position a as shown in FIG. 3, the light passage 27 is just totally covered by the primary blade 30 and the secondary blade 40, and accordingly, the light transmitting to the light passage 27 is just totally blocked by the primary blade 30 and the secondary blade 40. When the first post 41 is in the position b as shown in the FIG. 5, the light passage 27 is totally exposed to the mechanical shutter 100. The primary blade 30 and the secondary blade 40 are hid behind the cover 20, the light passage 27 is totally open, and the light transmitting to the light passage 27 can transmit into the mechanical shutter 100. The position a is close to the light passage 27, and the position b is farther from the light passage 27. When the first post 41 is in a position c of the first slot 25 which is between the position a and the position b as shown in FIG. 4. The light passage 27 is partly covered by the primary blade 30 and the secondary blade 40, and accordingly, the light transmitting to the light passage 27 is partly blocked by the primary blade 30 and the secondary blade 40.

It is noteworthy to that an actuator (not shown) can be provided and connected to the primary blade 30. Accordingly, the primary blade 30 can be driven to rotate around the connecting shaft 13 relative to the base 10, and the secondary blade 40 would move with the primary blade 30. Thus, the primary blade 30 and the secondary blade 40 can be controlled to cover or expose the light passage 27 to the mechanical shutter 100.

The base 10 and the cover 20 can be other shapes such as circular, oval or rectangle.

The base 10 can define a connecting hole to replace of the connecting shaft 13, and the cover 20 can define a connecting shaft to replace of the connecting hole 23, accordingly, the base 10 can be secured to the cover 20 by its connecting hole connecting with the connecting shaft of the cover 20.

In alternative embodiments, the cover 20 can define a post to replace of the first slot 25, and the secondary blade 40 can define a slot to replace of the first post 41.

Figure 6:
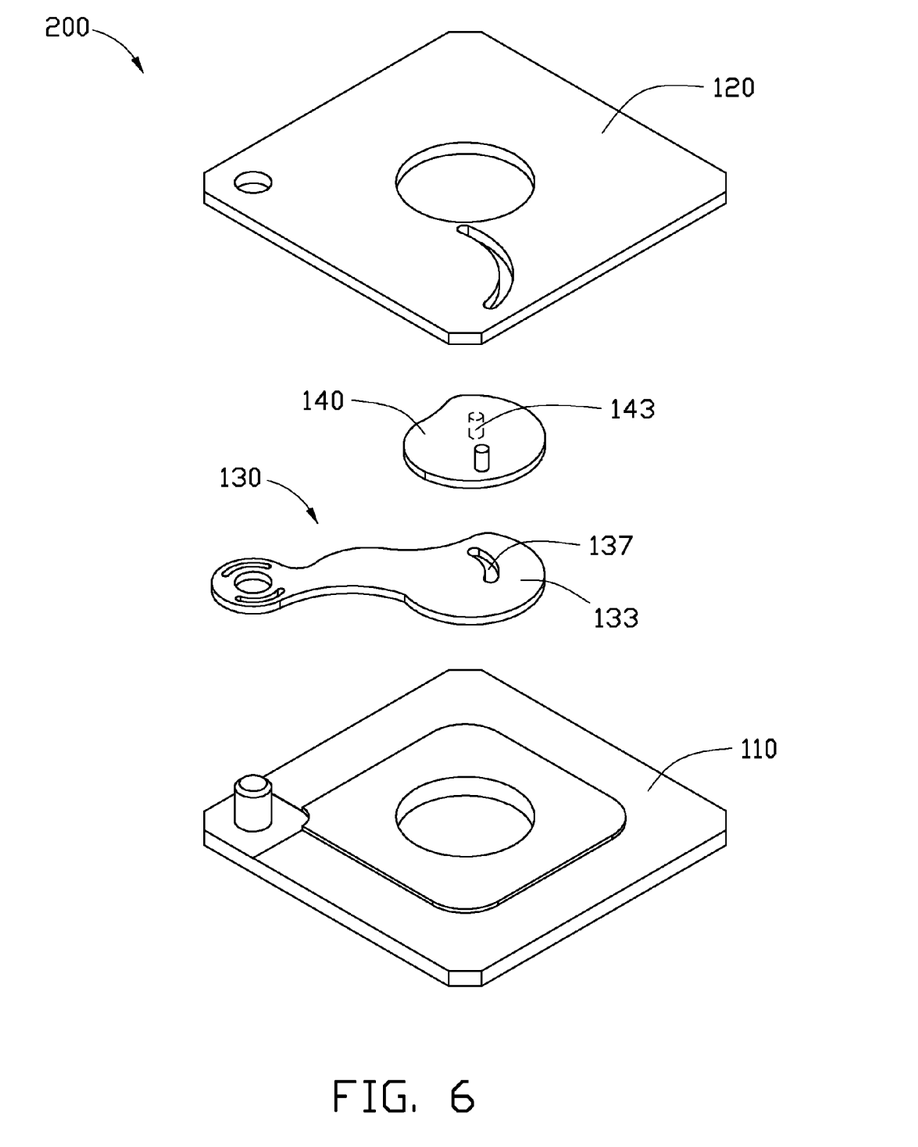
FIG. 6 is an exploded, isometric view of the mechanical shutter according to another embodiment.

Referring to FIG. 6, a mechanical shutter 200 in accordance with a second embodiment is provided. The mechanical shutter 200 includes a base 110, a cover 120, a primary blade 130 and a secondary blade 140.

The mechanical shutter 200 is similar to the mechanical shutter 100 in structure except that the switch end 133 of the primary blade 130 defines a second slot 137, and the secondary blade 140 includes a second post 143 extending upward to the base 110. The second post 143 is positioned on the surface of the secondary blade 140 which faces to the base 110. The diameter of the second post 143 is less than the width of the linkage slot 137. The second post 143 extends through the linkage slot 137. When the primary blade 130 rotates around the connecting shaft relative to the base 110, the primary blade 130 carries the secondary blade 140 to move, then the secondary blade 140 moves together to cover or expose the light passage of the mechanical shutter 200.

Figure 7:
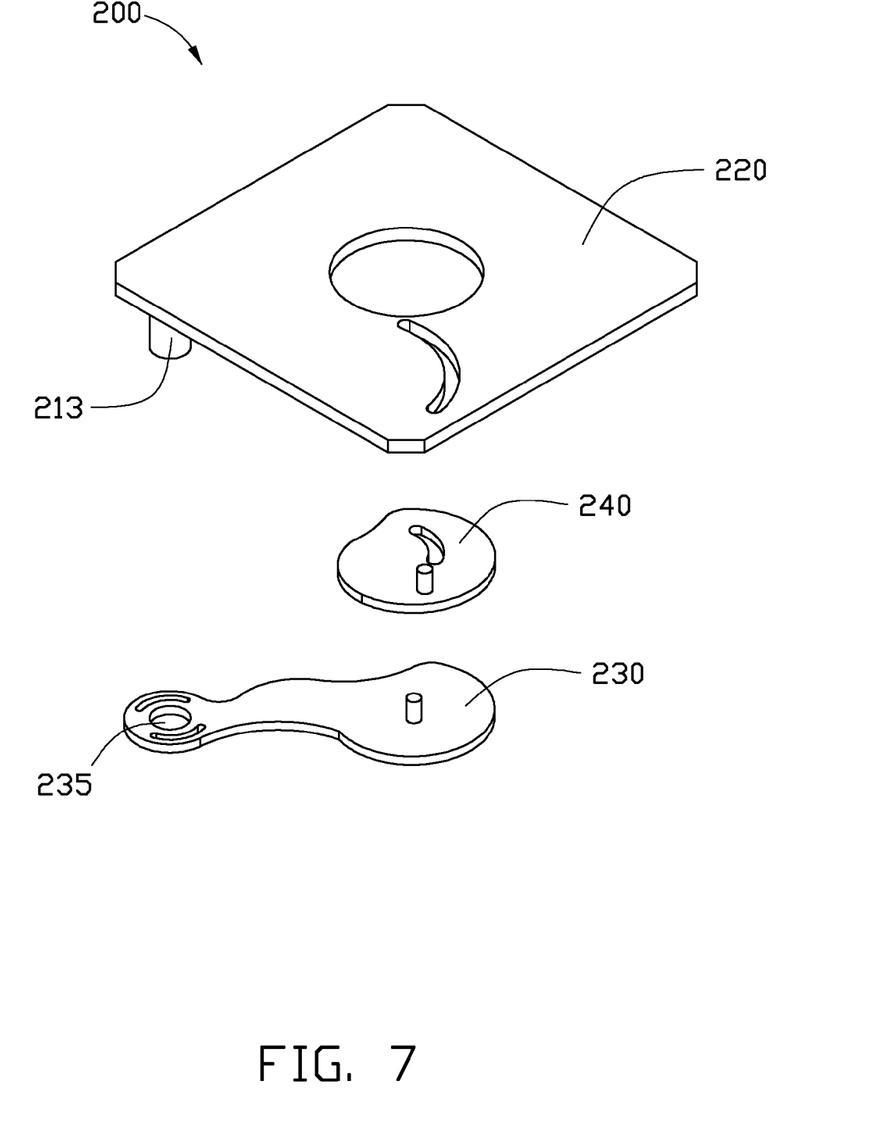
FIG. 7 is an exploded, isometric view of the mechanical shutter according to yet another embodiment.

Referring to FIG. 7, a mechanical shutter 300 in accordance with a third embodiment is provided. The mechanical shutter 200 includes a cover 220, a primary blade 230 and a secondary blade 240.

In this embodiment, the structure of the mechanical shutter 300 is almost the same as the structure of the mechanical shutter 100. The differences between the mechanical shutter 300 and the mechanical shutter 100 are as follow: The base 10 of the mechanical shutter 100 has been removed. The primary blade 230 defines a shaft hole 235. The cover 220 has a connecting shaft 213. The connecting shaft 213 extends through the shaft hole 235, thus, the primary blade 230 is pivotally secured to the cover 220, and the primary blade 230 can rotate around the connecting shaft 213 relative to the cover 220. When the primary blade 230 rotates around the connecting shaft 213 relative to the cover 220, the primary blade 230 carries the secondary blade 240, and the secondary blade 240 moves together to cover or expose the light passage of the mechanical shutter 300.

Figure 8:
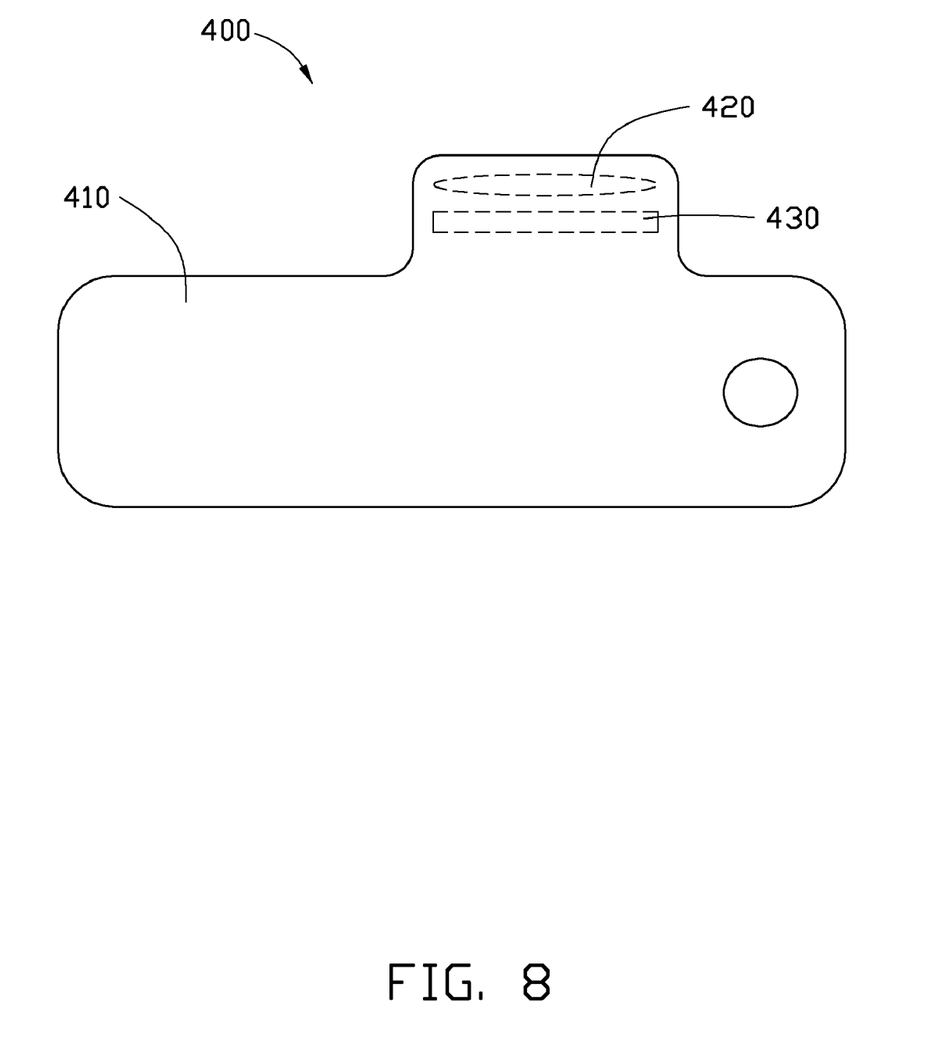
FIG. 8 is a schematic view of a portable electronic device with a mechanical shutter according to still yet another embodiment.

Referring to FIG. 8, a portable electronic device 400 in accordance with a fourth embodiment is provided. The portable electronic device 400 includes a main body 410 with a housing, a lens module 420 and a shutter 430. The lens module 420 and the shutter 430 are arranged in the housing of the main body 410. The shutter 430 is aligned with the lens module 420.

In this embodiment, the shutter 430 is the same as the mechanical shutter 100, or the mechanical shutter 200, or the mechanical shutter 300.

It is noteworthy that the portable electronic device 400 can be a cell phone, a MP3, a personal digital assistant (PDA), or a digital camera.

Due to a simpler structure of the shutter 430 with only two blades, it's not necessary for the portable electronic device 400 to provide a large amount of space to arrange the shutter 430. Thus, miniaturization of the portable electronic device 400 can be realized.

It is understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

What is claimed is:

1. A mechanical shutter, comprising:
a base comprising a first through hole defined therein; a connecting shaft extending from the base;
a cover comprising a second through hole and a connecting hole, the connecting shaft of the base extending through the connecting hole to secure the base to the cover, the base and the cover cooperatively forming a housing, the first through hole and the second through hole aligned with each other and cooperatively defining a light passage;
a primary blade defining a shaft hole, the connecting shaft extending through the shaft hole, the primary blade being rotatably secured to the base, the primary blade being capable of rotating around the connecting shaft relative to the base; and
a secondary blade movable relative to the primary blade;
wherein the mechanical shutter further comprises a first slot and a first post extending through the first slot, the first slot is defined in the secondary blade, the first post is fixed on the cover, and the first post is slidable in and along the first slot; the primary blade being rotatable around the connecting shaft relative to the base, so as to carry the secondary blade to move and rotate about the first post, the shape of the primary blade and the shape of the secondary blade remaining the same during the rotations, and thereby the primary blade and the secondary blade cooperatively totally covering or opening the light passage.

2. The mechanical shutter of claim 1, further comprising a second slot and a second post extending through the second slot, wherein the second slot is defined in the primary blade, the second post is positioned on the secondary blade, and the second post is slidable in and along the second slot.

3. The mechanical shutter of claim 2, wherein the second slot is arc-shaped.

4. The mechanical shutter of claim 2, wherein the second post is positioned on a surface of the secondary blade which faces toward the base.

5. The mechanical shutter of claim 1, wherein the first slot is arc-shaped.

6. The mechanical shutter of claim 1, wherein the base and the cover are generally square with four corners, the connecting shaft of the base is located in one of the four corners of the base, and the connecting hole of the cover is defined in one of the four corners of the cover spatially corresponding to the connecting shaft.

7. The mechanical shutter of claim 1, further comprising an actuator for driving the primary blade to rotate around the connecting shaft relative to the base.

8. The mechanical shutter of claim 1, further comprising a second slot and a second post extending through the second slot, wherein the second slot is defined in the secondary blade, the second post is positioned on the primary blade, and the second post is slidable in and along the second slot.

9. A mechanical shutter, comprising:
a cover comprising a light passage defined therein;
a connecting shaft extending from the cover;
a primary blade defining a shaft hole, the connecting shaft extending through the shaft hole, the primary blade being rotatably secured to the cover, the primary blade being capable of rotating around the connecting shaft relative to the cover; and
a secondary blade movable relative to the primary blade;
wherein the mechanical shutter further comprises a first slot and a first post extending through the first slot, the first slot is defined in the cover, the first post is fixed on the secondary blade, and the first post is slidable in and along the first slot; the primary blade being rotatable around the connecting shaft relative to the cover, so as to carry the secondary blade to move and rotate about the first post, the shape of the primary blade and the shape of the secondary blade remaining the same during the rotations, and thereby the primary blade and the secondary blade cooperatively totally covering or opening the light passage.

10. The mechanical shutter of claim 9, further comprising a second slot and a second post extending through the second slot, wherein the second slot is defined in the primary blade, the second post is positioned on the secondary blade, and the second post is slidable in and along the second slot.

11. The mechanical shutter of claim 10, wherein the second slot is arc-shaped.

12. The mechanical shutter of claim 10, wherein the second post is positioned on a surface of the secondary blade which faces toward the base.

13. The mechanical shutter of claim 9, wherein the first slot is arc-shaped.

14. The mechanical shutter of claim 9, wherein the cover is generally square with four corners, and the connecting shaft is located in one of the four corners of the cover.

15. The mechanical shutter of claim 9, further comprising an actuator for driving the primary blade to rotate around the connecting shaft relative to the cover.

16. The mechanical shutter of claim 9, further comprising a second slot and a second post extending through the second slot, wherein the second slot is defined in the secondary blade, the second post is positioned on the primary blade, and the second post is slidable in and along the second slot.

17. A portable electronic device, comprising:
a housing;
a lens module received in the housing; and
a mechanical shutter aligned with the lens module, the mechanical shutter comprising:
a cover comprising a through hole;
a primary blade pivotally coupled to the cover;
an actuator positioned to directly drive the primary blade to rotate; and
a secondary blade driven by the primary blade and positioned between the cover and the primary blade;
wherein the mechanical shutter further comprises a first slot and a first post extending through the first slot and being slidable in and along the first slot, the first slot defined in one of the cover and the secondary blade, and the first post fixed on the other of the cover and the secondary blade;
wherein the mechanical shutter further comprises a second slot and a second post extending through the second slot and being slidable in and along the second slot, the second slot defined in one of the primary blade and the secondary blade, and the second post positioned on the other of the primary blade and the secondary blade; and
wherein the primary blade and the secondary blade are movable relative to the cover between a first position where the first post is adjacent to a first end of the first slot, the second post is adjacent to a first end of the second slot, and the primary blade and the secondary blade cooperatively totally cover the through hole, and a second position where the first post is adjacent to a second end of the first slot opposite to the first end thereof, the second post is adjacent to a second end of the second slot opposite to the first end thereof, and the primary blade and the secondary blade are moved away from the through hole for allowing light to pass therethrough.

18. The portable electronic device of claim 17, wherein the cover is generally square with four corners, and a connecting shaft is located in one of the four corners of the cover.

19. The portable electronic device of claim 18, wherein the mechanical shutter further comprises a base, the base comprises a light penetrating hole and a connecting hole, the connecting shaft of the cover extending through the connecting hole to secure the cover to the base, the base and the cover cooperatively forming a housing, and the through hole and the light penetrating hole aligned with each other and cooperatively defining a light passage.

20. The portable electronic device of claim 17, wherein the primary blade is rotatable relative to the cover about an axis, the first and second posts being substantially parallel to the axis.

* * * * *